(12) United States Patent
Yoshida (10) Patent No.: US 9,457,844 B2
(45) Date of Patent: Oct. 4, 2016

(54) PILLAR STRUCTURE AND VEHICLE SIDE PORTION STRUCTURE

(71) Applicant: TOYOTA JIDOSHA KABUSHIKI KAISHA, Toyota-shi, Aichi-ken (JP)

(72) Inventor: Eiji Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/645,909

(22) Filed: Mar. 12, 2015

(65) Prior Publication Data
US 2015/0291218 A1 Oct. 15, 2015

(30) Foreign Application Priority Data
Apr. 15, 2014 (JP) ................. 2014-083885

(51) Int. Cl.
*B62D 25/04* (2006.01)

(52) U.S. Cl.
CPC ................... *B62D 25/04* (2013.01)

(58) Field of Classification Search
CPC ..... B62D 27/02; B62D 25/04; B62D 21/157
USPC ............. 296/203.01, 203.03, 187.12, 193.06
See application file for complete search history.

(56) References Cited

U.S. PATENT DOCUMENTS

| | | | | |
|---|---|---|---|---|
| 6,474,726 B1 * | 11/2002 | Hanakawa | ............. | B62D 25/04 296/187.12 |
| 7,445,269 B2 * | 11/2008 | Yustick | ................. | B62D 21/157 296/187.01 |
| 7,677,645 B2 * | 3/2010 | Henkelmann | .......... | B62D 25/04 296/187.12 |
| 8,491,047 B1 * | 7/2013 | Moll | ....................... | B62D 25/04 296/193.06 |
| 9,174,602 B1 * | 11/2015 | Moore | .................. | B60R 21/215 |
| 2004/0113461 A1 * | 6/2004 | Shimizu | ................. | C21D 1/673 296/193.06 |
| 2008/0315628 A1 * | 12/2008 | Obayashi | ............... | B62D 25/04 296/193.06 |
| 2010/0231004 A1 * | 9/2010 | Lakic | ..................... | B62D 25/04 296/193.06 |
| 2010/0244492 A1 * | 9/2010 | Itakura | ................... | B62D 25/04 296/193.06 |
| 2011/0095567 A1 * | 4/2011 | Ishigame | ............. | B62D 21/157 296/187.03 |
| 2011/0133515 A1 * | 6/2011 | Mori | .................... | B62D 21/157 296/193.06 |
| 2011/0266836 A1 * | 11/2011 | Heo | ....................... | B62D 25/04 296/193.06 |
| 2012/0119477 A1 * | 5/2012 | Kim | ....................... | B62D 25/04 280/801.2 |
| 2013/0257098 A1 * | 10/2013 | Matsuda | ................ | B62D 25/00 296/187.12 |
| 2014/0028056 A1 * | 1/2014 | Nishimura | ............ | B62D 25/04 296/193.06 |

FOREIGN PATENT DOCUMENTS

| | | | | |
|---|---|---|---|---|
| DE | WO 2015014598 A1 * | 2/2015 | ............ | B62D 25/02 |
| JP | 2011-037291 A | 2/2011 | | |
| JP | 2011-230752 A | 11/2011 | | |
| JP | 2011-251659 A | 12/2011 | | |
| JP | 2013-212730 A | 10/2013 | | |
| JP | 2013-220807 A | 10/2013 | | |

* cited by examiner

*Primary Examiner* — Pinel Romain
(74) *Attorney, Agent, or Firm* — Oliff PLC (57) ABSTRACT

There is provided a pillar structure comprising: an outer panel that extends in a vehicle up and down direction and that is equipped with a pair of outer flange portions that extend in a vehicle front and rear direction, and outer longitudinal wall portions that extend outward in a vehicle width direction from the pair of outer flange portions; an inner panel that is disposed on a vehicle width direction inside of the outer panel and extends in the vehicle up and down direction along the outer panel and that is equipped with a pair of inner flange portions joined to the pair of outer flange portions, and inner longitudinal wall portions that extend outward in the vehicle width direction from the inner flange portions; and longitudinal wall joint portions formed by joining the outer longitudinal wall portions and the inner longitudinal wall portions to one another.

10 Claims, 8 Drawing Sheets

PRIOR ART

FIG.8
PRIOR ART

PILLAR STRUCTURE AND VEHICLE SIDE PORTION STRUCTURE

CROSS-REFERENCE TO RELATED APPLICATION

This application is based on and claims priority under 35 USC 119 from Japanese Patent Application No. 2014-083885 filed on Apr. 15, 2014, the disclosure of which is incorporated by reference herein.

BACKGROUND

1. Technical Field

The present invention relates to a pillar structure and a vehicle side portion structure.

2. Related Art

As a pillar structure equipped with an outer panel and an inner panel, Japanese Patent Application Laid-Open (JP-A) No. 2011-251659 discloses a pillar structure where a cross-sectionally hat-shaped outer panel and a cross-sectionally hat-shaped inner panel are joined to one another at flange portions on both end portions. Furthermore, in the pillar structure of JP-A No. 2011-251659, a reinforcement member is disposed between the outer panel and the inner panel, and the reinforcement member is joined at flange portions to both the inner panel and the outer panel.

However, when, during a side impact to the vehicle to which this pillar structure is applied, the impact load is input to the pillar structure, the outer panel and the inner panel become deformed in directions in which they move away from one another. As a result, stress concentrates in the flange portions that are the joint portions between the outer panel and the inner panel, so there is room for improvement in terms of maintaining the joint state of the pillar structure during a side impact.

SUMMARY

In consideration of the circumstances described above, it is an object of the present invention to obtain a pillar structure and a vehicle side portion structure with which the joint state of the pillar structure can be maintained during a side impact.

A first aspect of the present invention provides a pillar structure including:

an outer panel that extends in a vehicle up and down direction in a state in which the pillar structure is attached to a vehicle, the outer panel being equipped with a pair of outer flange portions that extend in a vehicle front and rear direction, outer longitudinal wall portions that extend outward in a vehicle width direction from the pair of outer flange portions, and an outer crown portion that interconnects vehicle width direction outside end portions of the outer longitudinal wall portions;

an inner panel that is disposed on a vehicle width direction inside of the outer panel and extends in the vehicle up and down direction along the outer panel, the inner panel being equipped with a pair of inner flange portions that are joined to the pair of outer flange portions, inner longitudinal wall portions that extend outward in the vehicle width direction from the pair of inner flange portions, and an inner crown portion that interconnects vehicle width direction outside end portions of the inner longitudinal wall portions; and longitudinal wall joint portions that are formed by joining the outer longitudinal wall portions and the inner longitudinal wall portions to one another.

In the pillar structure of the first aspect of the present invention, the inner panel is disposed on the vehicle width direction inside of the outer panel, and the outer flange portions of the outer panel and the inner flange portions of the inner panel are joined to one another. Furthermore, the outer longitudinal wall portions that extend outward in the vehicle width direction from the outer flange portions are disposed in the outer panel, and the inner longitudinal wall portions that extend outward in the vehicle width direction from the inner flange portions are disposed in the inner panel. Here, the longitudinal wall joint portions are formed by joining the outer longitudinal wall portions and the inner longitudinal wall portions to one another. Because of this, the outer panel and the inner panel become joined to one another at the flange portions and the longitudinal wall joint portions, so even in a case where, during a side impact to the vehicle, the impact load has been input from the impactor to the pillar structure, bidirectional deformation, in which the outer panel and the inner panel become deformed in directions in which they move away from one another, can be controlled.

A second aspect of the present invention provides a pillar structure including:

an outer panel that extends in a vehicle up and down direction in a state in which the pillar structure is attached to a vehicle, the outer panel being equipped with a pair of outer flange portions that extend in a vehicle front and rear direction, outer longitudinal wall portions that extend outward in a vehicle width direction from the pair of outer flange portions, and an outer crown portion that interconnects vehicle width direction outside end portions of the outer longitudinal wall portions;

an inner panel that is disposed on a vehicle width direction inside of the outer panel and extends in the vehicle up and down direction along the outer panel, the inner panel being equipped with a pair of inner flange portions that are joined to the pair of outer flange portions, inner longitudinal wall portions that extend outward in the vehicle width direction from the pair of inner flange portions, and an inner crown portion that interconnects vehicle width direction outside end portions of the inner longitudinal wall portions;

a reinforcement member that is disposed between the outer panel and the inner panel, the reinforcement member being equipped with a pair of reinforcement flange portions that are joined to the outer flange portions and the inner flange portions, reinforcement longitudinal wall portions that extend outward in the vehicle width direction from the pair of reinforcement flange portions, and a reinforcement crown portion that interconnects vehicle width direction outside end portions of the reinforcement longitudinal wall portions; and longitudinal wall joint portions that are formed by joining the inner longitudinal wall portions and the reinforcement longitudinal wall portions to one another.

In the pillar structure of the second aspect of the present invention, the reinforcement member is disposed between the outer panel and the inner panel. Furthermore, the reinforcement flange portions of the reinforcement member are joined to both the outer flange portions of the outer panel and the inner flange portions of the inner panel. Moreover, the longitudinal wall joint portions are formed by joining the reinforcement longitudinal wall portions of the reinforcement member and the inner longitudinal wall portions of the inner panel to one another. Because of this, the reinforcement member and the inner panel become joined to one another at the flange portions and the longitudinal wall joint portions, so even in a case where, during a side impact to the vehicle, the impact load has been input from the impactor to the pillar structure, bidirectional deformation, in which the reinforcement member and the inner panel become deformed in directions in which they move away from one another, can be controlled.

A third aspect of the present invention provides the pillar structure of the first aspect, wherein a closed cross section is configured by the outer panel and the inner panel.

In the pillar structure of the third aspect of the present invention, the closed cross section is configured by the outer panel and the inner panel, so rigidity can be improved.

A fourth aspect of the present invention provides the pillar structure of the second aspect, wherein a closed cross section is configured by the reinforcement member and the inner panel.

In the pillar structure of the fourth aspect of the present invention, the closed cross section is configured by the reinforcement member and the inner panel, so rigidity can be improved.

A fifth aspect of the present invention provides the pillar structure of any one of the first through fourth aspects, wherein the longitudinal wall joint portions are at least disposed on the vehicle upper side of a door beltline in a state in which the pillar structure is attached to a vehicle.

In the pillar structure of the fifth aspect of the present invention, deformation in which the outer panel and the inner panel become deformed in directions in which they move away from one another can be effectively controlled. That is, during a side impact to the vehicle, the region with which, for example, the front bumper of the impactor comes into contact is oftentimes the region on the vehicle lower side of the beltline, and this region becomes deformed inwardly in the vehicle width direction by the impact from the impactor. On the other hand, on the vehicle upper side of the beltline, compressive stress acts outwardly in the vehicle width direction and tensile stress acts inwardly in the vehicle width direction. For this reason, the outer panel and the inner panel tend to become deformed in directions in which they move away from one another. Here, by disposing the longitudinal wall joint portions at least on the vehicle upper side of the door beltline, the deformation described above can be effectively controlled.

A sixth aspect of the present invention provides the pillar structure of any one of the first through fifth aspects, wherein, in the longitudinal wall joint portions of the inner longitudinal wall portions, there are disposed bearing surfaces that bulge out in opposite directions from directions heading toward the opposing inner longitudinal wall portions.

In the pillar structure of the sixth aspect of the present invention, the joint surfaces can be adjusted by simply adjusting the bearing surfaces.

A seventh aspect of the present invention provides a vehicle side portion structure including:

a center pillar to which the pillar structure of any one of the first through sixth aspects is applied; and a vehicle side portion equipped with the center pillar in its vehicle front and rear direction center portion.

In the vehicle side portion structure of the seventh aspect of the present invention, the effects of any of the first to sixth aspects can be obtained.

As described above, according to the first aspect and the seventh aspect of the present invention, the invention has the superior effect that the joint state of the pillar structure can be well maintained during a side impact.

According to the second aspect of the present invention, the invention has the superior effects that the joint state of the pillar structure can be well maintained during a side impact and the design can be kept from being marred.

According to the third aspect and the fourth aspect of the present invention, the invention has the superior effect that deformation of the pillar structure during a side impact can be controlled.

According to the fifth aspect of the present invention, the invention has the superior effect that the joint state of the pillar structure can be better maintained during a side impact.

According to the sixth aspect of the present invention, the invention has the superior effect that the amount of time it takes to adjust the joint surfaces can be shortened.

BRIEF DESCRIPTION OF THE DRAWINGS

Exemplary embodiments of the present invention will be described in detail based on the following figures, wherein.

DETAILED DESCRIPTION

A vehicle side portion structure and a pillar structure pertaining to the present invention will be described below on the basis of the drawings. It will be noted that arrow FR appropriately shown in the drawings indicates a vehicle front side, arrow UP indicates a vehicle upper side, and arrow OUT indicates outward in a vehicle width direction. Furthermore, the pillar structure pertaining to the present invention is configured to be bilaterally symmetrical in the vehicle width direction. For this reason, the left side section of the vehicle will be described below and description regarding the right side section of the vehicle will be omitted.

First Embodiment

Vehicle Side Portion Structure

Figure 1:
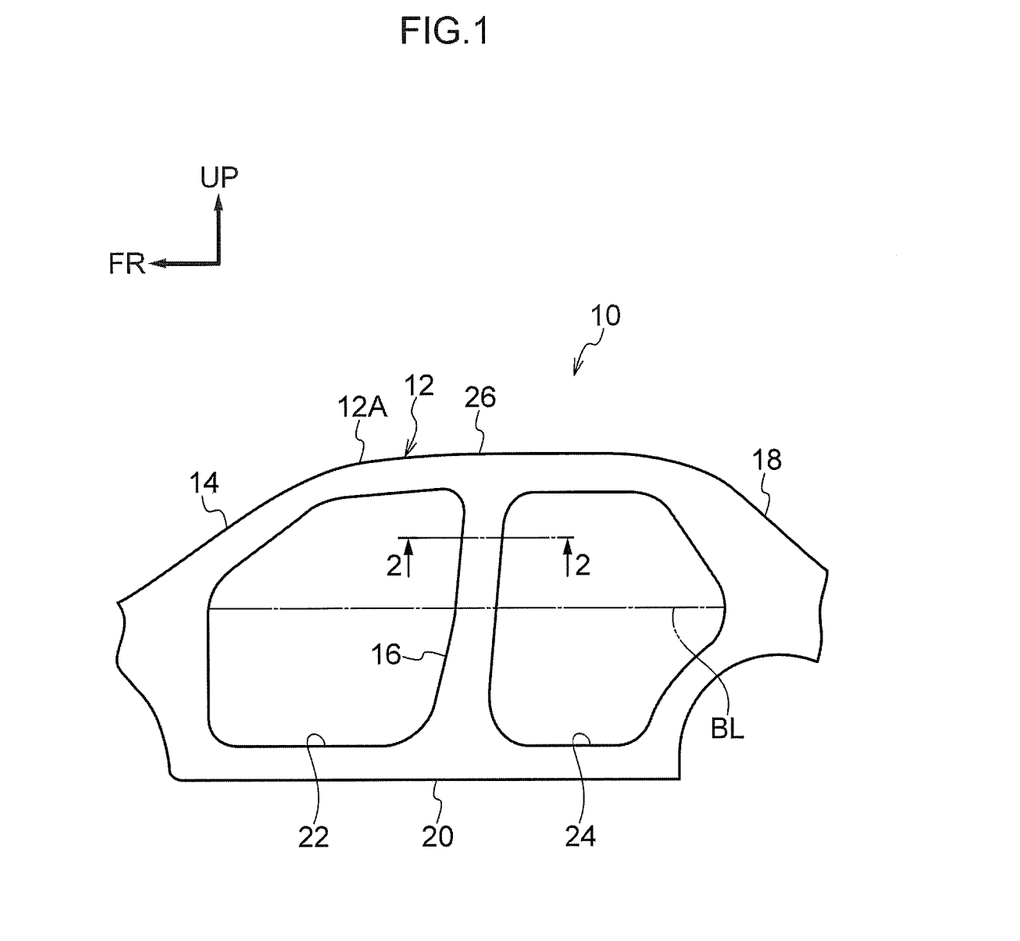
FIG. 1 is a side view showing main portions of a vehicle to which a vehicle side portion structure pertaining to a first embodiment is applied.

As shown in FIG. 1, a vehicle 12 to which a vehicle side portion structure 10 pertaining to a first embodiment of the present invention is applied is equipped with a front pillar 14 that is disposed on a front portion of a vehicle side portion 12A and extends in the vehicle up and down direction. Furthermore, a center pillar 16 that extends in the vehicle up and down direction is disposed on the vehicle rear side of the front pillar 14, and a rear pillar 18 that extends in the vehicle up and down direction is disposed on the vehicle rear side of the center pillar 16.

The lower end portion of the front pillar 14, the lower end portion of the center pillar 16, and the lower end portion of the rear pillar 18 are coupled to one another by a rocker 20 that extends in the vehicle front and rear direction. The rocker 20 configures the lower portion of the vehicle 12, and a front side door opening 22 for allowing an occupant to get into and out of the vehicle 12 is formed by the front pillar 14, the center pillar 16, the rocker 20, and a roof side rail 26. A rear side door opening 24 is formed on the vehicle rear side of the front side door opening 22, and the front side door opening 22 and the rear side door opening 24 can be opened and closed by a front side door and a rear side door not shown in the drawings. Here, as shown in FIG. 2, a pillar structure 28 pertaining to the present embodiment is applied to the center pillar 16.

(Pillar Structure)

Figure 2:
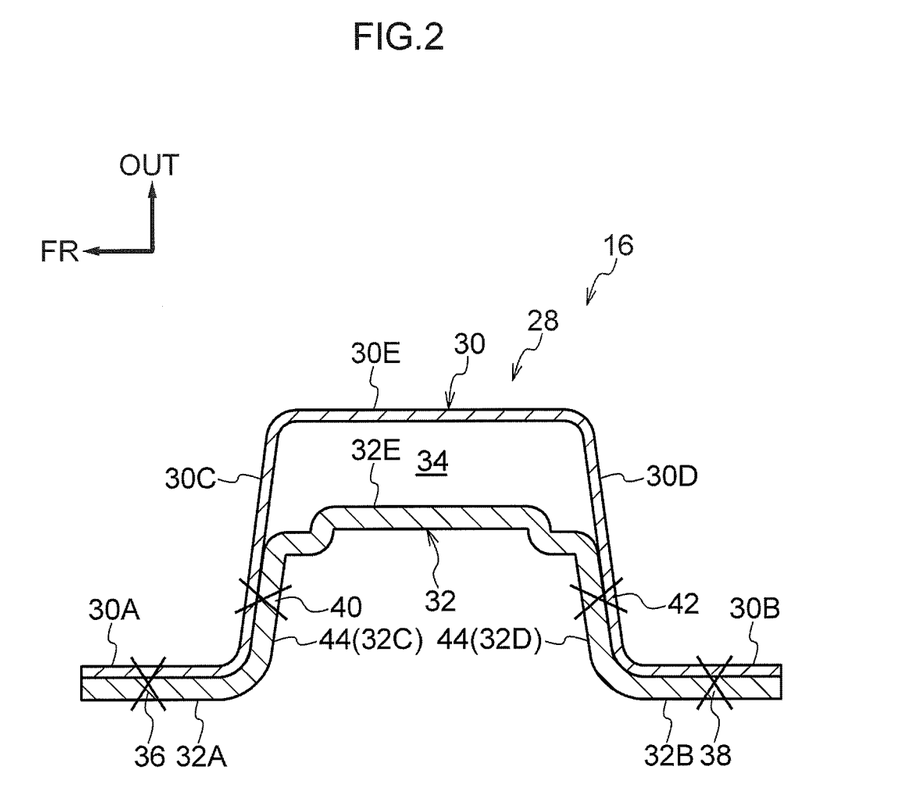
FIG. 2 is an enlarged cross-sectional view showing a cross section cut along line 2-2 of FIG. 1.

As shown in FIG. 2, the center pillar 16 to which the pillar structure 28 pertaining to the present embodiment is applied is mainly configured to include an outer panel 30 and an inner panel 32.

The outer panel 30 is a metal member configured to include a pair of outer flange portions 30A and 30B, a pair of outer longitudinal wall portions 30C and 30D, and an outer crown portion 30E, and the outer panel 30 is formed in a substantially hat shape whose cross section is open inward in the vehicle width direction. The outer flange portion 30A is disposed on the front end portion of the outer panel 30 and extends in the vehicle front and rear direction. Furthermore, the outer flange portion 30B is disposed on the rear end portion of the outer panel 30 and extends in the vehicle front and rear direction. It will be noted that, in the present embodiment, although the outer flange portion 30A and the outer flange portion 30B are formed in substantially the same length, the outer flange portion 30A and the outer flange portion 30B are not limited to this and may also be formed in different lengths.

The outer longitudinal wall portion 30C extends outward in the vehicle width direction from the rear end portion of the outer flange portion 30A. Furthermore, the outer longitudinal wall portion 30D extends outward in the vehicle width direction from the front end portion of the outer flange portion 30B. The outer longitudinal wall portion 30C and the outer longitudinal wall portion 30D are formed in substantially the same length and are slanted in such a way that their vehicle width direction outside end portions become closer to one another as seen in a plan view. Moreover, the vehicle width direction outside end portion of the outer longitudinal wall portion 30C and the vehicle width direction outside end portion of the outer longitudinal wall portion 30D are coupled to one another in the vehicle front and rear direction by the outer crown portion 30E.

The inner panel 32 is disposed on the vehicle width direction inside of the outer panel 30 configured as described above. The inner panel 32 is a metal member formed in a cross-sectionally substantially hat shape and is mainly configured to include a pair of inner flange portions 32A and 32B, a pair of inner longitudinal wall portions 32C and 32D, and an inner crown portion 32E.

The inner flange portion 32A is disposed on the front end portion of the inner panel 32, extends in the vehicle front and rear direction, and is in contact with the inner surface of the outer flange portion 30A. Furthermore, the inner flange portion 32B is disposed on the rear end portion of the inner panel 32, extends in the vehicle front and rear direction, and is in contact with the inner surface of the outer flange portion 30B.

The inner longitudinal wall portion 32C extends outward in the vehicle width direction along the outer longitudinal wall portion 30C from the rear end portion of the inner flange portion 32A, and the inner longitudinal wall portion 32D extends outward in the vehicle width direction along the outer longitudinal wall portion 30D from the front end portion of the inner flange portion 32B. Furthermore, the vehicle width direction outside end portion of the inner longitudinal wall portion 32C and the vehicle width direction outside end portion of the inner longitudinal wall portion 32D are coupled to one another in the vehicle front and rear direction by the inner crown portion 32E. A space is disposed between the inner panel 32 and the outer panel 30 configured as described above, so that a closed cross section 34 is configured by the inner panel 32 and the outer panel 30.

Here, the outer flange portion 30A and the inner flange portion 32A are disposed on top of one another in the vehicle width direction and are joined to one another by spot welding, for example, so that a flange joint portion 36 is formed. Furthermore, the outer flange portion 30B and the inner flange portion 32B are likewise disposed on top of one another in the vehicle width direction and are joined to one another by spot welding, for example, so that a flange joint portion 38 is formed.

The outer longitudinal wall portion 30C and the inner longitudinal wall portion 32C are disposed on top of one another in the vehicle front and rear direction and are joined to one another by spot welding, for example, so that a longitudinal wall joint portion 40 is formed. Furthermore, the outer longitudinal wall portion 30D and the inner longitudinal wall portion 32D are likewise disposed on top of one another in the vehicle front and rear direction and are joined to one another by spot welding, for example, so that a longitudinal wall joint portion 42 is formed.

Figure 3:
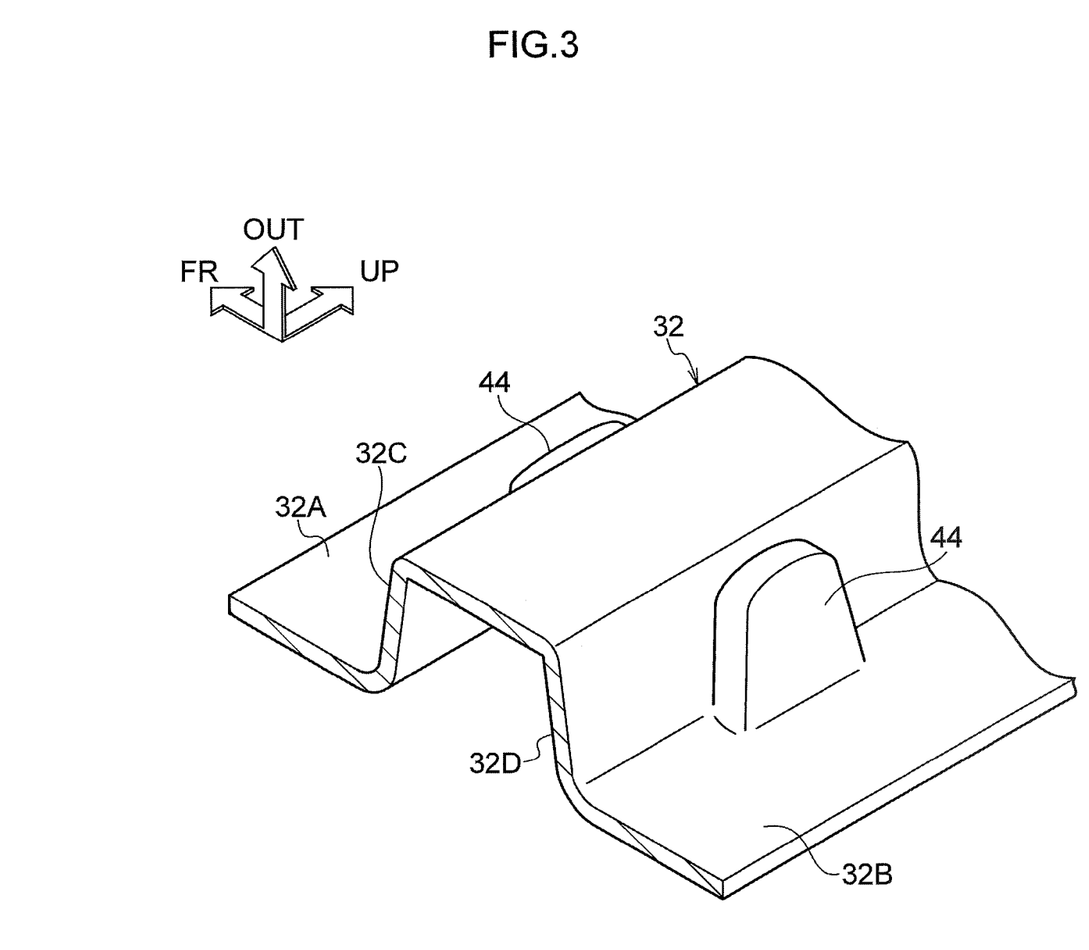
FIG. 3 is an enlarged perspective view showing main portions of an inner panel that configures a pillar structure pertaining to the first embodiment.

Furthermore, as shown in FIG. 3, the inner longitudinal wall portion 32D of the inner panel 32 is disposed with a bearing surface 44 that bulges out toward the opposite side of the direction heading toward the opposing inner longitudinal wall portion 32C. Additionally, this bearing surface 44 is laid on top of and joined to the outer longitudinal wall portion 30D of the outer panel 30. In other words, the bearing surface 44 is disposed in the region of the inner longitudinal wall portion 32D that becomes the longitudinal wall joint portion 42. Furthermore, the inner longitudinal wall portion 32C is disposed with a bearing surface 44 that is same as the one disposed in the inner longitudinal wall portion 32D.

It will be noted that, in the present embodiment, although the outer panel 30 and the inner panel 32 are formed by metal members, the outer panel 30 and the inner panel 32 are not limited to this and may also be formed of another material. For example, the outer panel 30 and the inner panel 32 may also be formed of a resin material such as fiber-reinforced resin.

Furthermore, in the present embodiment, although the flange joint portions 36 and 38 and the longitudinal wall joint portions 40 and 42 are formed by spot welding, the outer panel 30 and the inner panel 32 may also be joined to one another by another method. For example, the flange joint portions 36 and 38 and the longitudinal wall joint portions 40 and 42 may also be formed by laser welding, and the outer panel 30 and the inner panel 32 may also be joined to one another using an adhesive. Furthermore, the outer panel 30 and the inner panel 32 may also be joined to one another using rivets or bolts and nuts.

(Action and Effects)

Next, the action and effects of the vehicle side portion structure and the pillar structure of the present embodiment will be described.

As shown in FIG. 2, in the pillar structure 28 of the present embodiment, the outer panel 30 and the inner panel 32 are joined to one another at the flange joint portions 36 and 38 and the longitudinal wall joint portions 40 and 42. For this reason, during a side impact, deformation in which the outer panel 30 and the inner panel 32 become deformed in directions in which they move away from one another can be controlled.

Figure 7:
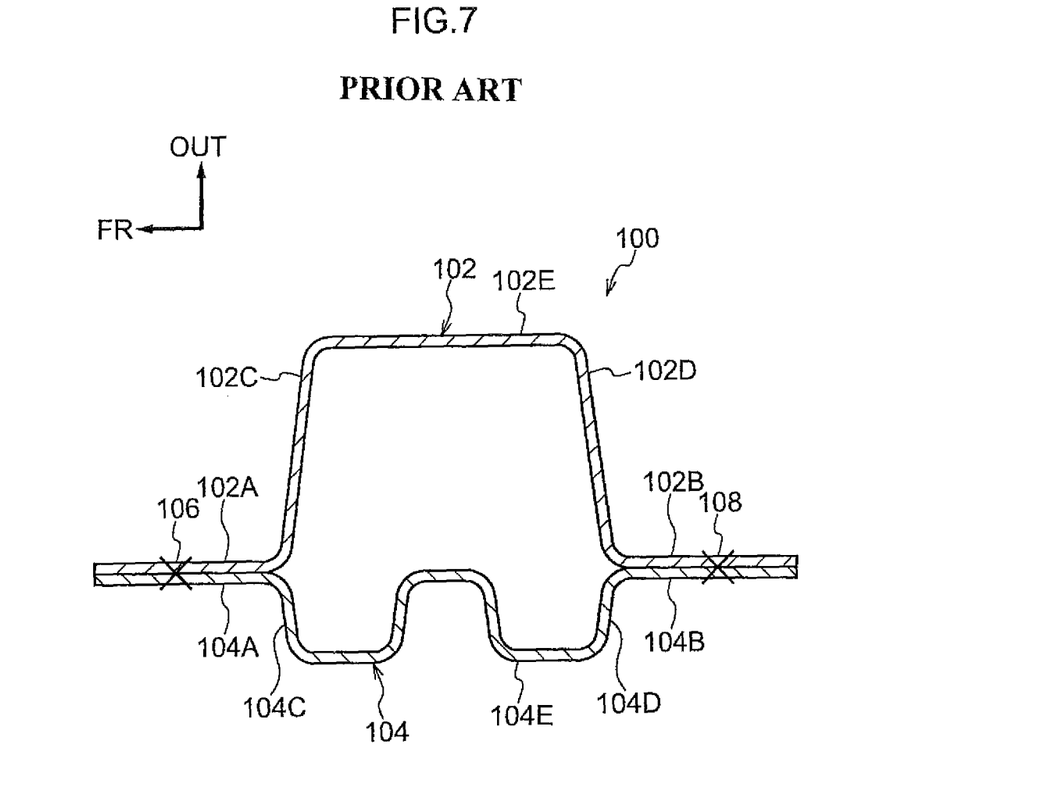
FIG. 7 is a cross-sectional view corresponding to FIG. 2 showing a pillar structure of a comparative example.

This effect will be described using a comparative example. As shown in FIG. 7, a center pillar 100 of the comparative example is equipped with an outer panel 102 and an inner panel 104. The outer panel 102 is configured to include outer flange portions 102A and 102B, outer longitudinal wall portions 102C and 102D, and an outer crown portion 102E, and the outer panel 102 is formed in a cross-sectionally substantially hat shape whose vehicle width direction inside is open as seen in a plan view. The inner panel 104 is configured to include inner flange portions 104A and 104B, inner longitudinal wall portions 104C and 104D, and an inner crown portion 104E.

Furthermore, the inner flange portion 104A and the outer flange portion 102A are laid on top of one another in the vehicle width direction and are joined to one another by spot welding, for example, so that a flange joint portion 106 is formed. Furthermore, the inner flange portion 104B and the outer flange portion 102B are laid on top of one another in the vehicle width direction and are joined to one another by spot welding, for example, so that a flange joint portion 108 is formed.

Here, the inner longitudinal wall portion 104C and the inner longitudinal wall portion 104D extend inward in the vehicle width direction from the inner flange portion 104A and the inner flange portion 104B, respectively. That is, the inner longitudinal wall portions 104C and 104D extend toward the opposite side of the outer longitudinal wall portions 102C and 102D, so the inner longitudinal wall portions 104C and 104D and the outer longitudinal wall portions 102C and 102D are not joined to one another and longitudinal wall joint portions are not disposed. In this respect, the pillar structure of the comparative example differs from the pillar structure 28 pertaining to the present embodiment. It will be noted that, although the inner crown portion 104E of this comparative example has a shape in which its vehicle front and rear direction center portion is recessed outward in the vehicle width direction, the inner crown portion 104E is not limited to this, and a pillar structure where the inner crown portion 104E is formed substantially parallel to the outer crown portion 102E may also be used as a comparative example.

Here, stress that acts on the center pillar 100 configured as described above during a side impact to a vehicle equipped with the center pillar 100 will be considered. During a side impact, the region with which, for example, the front bumper of the barrier comes into contact is oftentimes the region on the vehicle lower side of a beltline BL, and this region becomes deformed inwardly in the vehicle width direction by the impact from the barrier. At the same time, on the vehicle upper side of the beltline BL, compressive stress acts on the outer panel 102 positioned on the vehicle width direction outside and tensile stress acts on the inner panel 104 positioned on the vehicle width direction inside.

Figure 8:
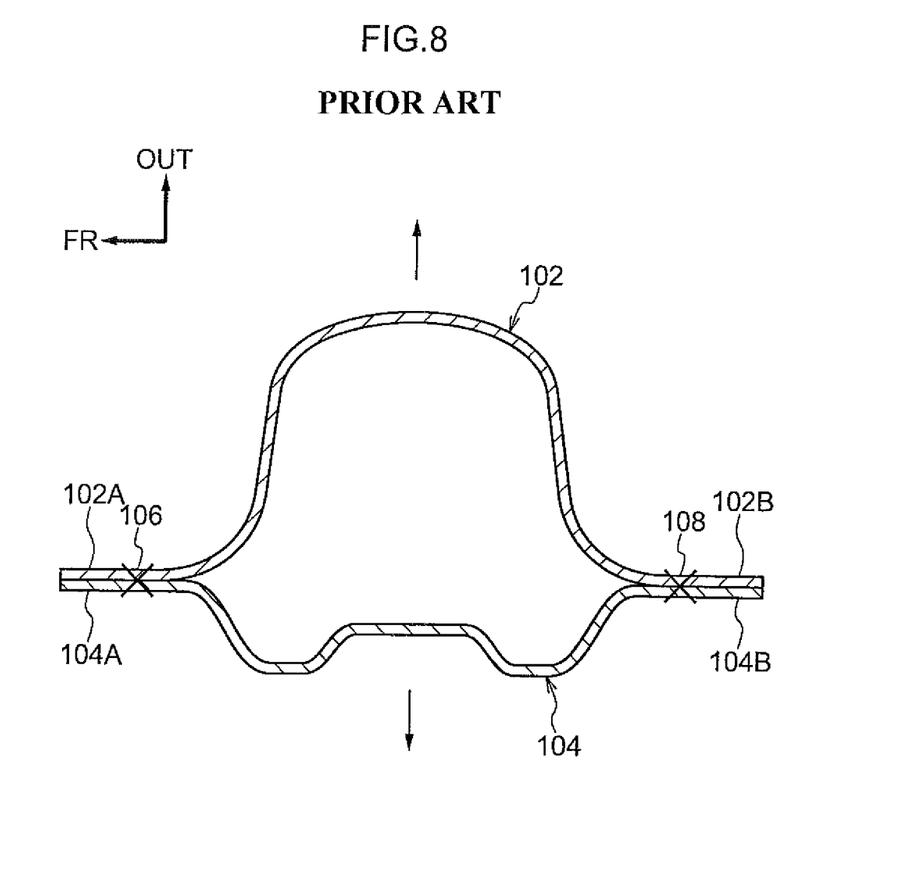
FIG. 8 is a cross-sectional view corresponding to FIG. 2 showing a state in which an impact load has been input to the pillar structure of the comparative example.

For this reason, as shown in FIG. 8, in the center pillar 100 at least on the vehicle upper side of the beltline BL, the outer panel 102 becomes deformed outwardly in the vehicle width direction and the inner panel 104 becomes deformed inwardly in the vehicle width direction. That is, the outer panel 102 and the inner panel 104 undergo bidirectional deformation in which they become displaced in directions in which they move away from one another. Because of this, stress concentrates in the flange joint portion 106 and the flange joint portion 108 on both end portions. Particularly in a case where the outer panel 102 or the inner panel 104 is formed of high-tensile strength steel in order to improve strength, the outer panel 102 and the inner panel 104 become deformed and cannot allow the stress to escape, and the stress concentrates in the flange joint portion 106 and the flange joint portion 108. As a result, sometimes the outer panel 102 and the inner panel 104 undergo bidirectional deformation and become unable to maintain their joint state.

In contrast, as shown in FIG. 2, according to the pillar structure 28 pertaining to the present embodiment, the inner longitudinal wall portion 32C and the outer longitudinal wall portion 30C are joined to one another by the longitudinal wall joint portion 40, and the inner longitudinal wall portion 32D and the outer longitudinal wall portion 30D are joined to one another by the longitudinal wall joint portion 42. Because of this, even in a case where, during a side impact to the vehicle, the impact load has been transmitted from the barrier to the center pillar 16, deformation in which the outer panel 30 and the inner panel 32 become deformed in directions in which they move away from one another can be controlled. That is, the joint state between the outer panel 30 and the inner panel 32 can be maintained. Furthermore, the impact load can be dispersed to the flange joint portions 36 and 38 and the longitudinal wall joint portions 40 and 42, so the impact load can be well transmitted compared to a configuration where the outer panel 30 and the inner panel 32 are joined to one another only at the flange joint portions 36 and 38.

Moreover, in the pillar structure 28 of the present embodiment, the closed cross section 34 is configured by the inner panel 32 and the outer panel 30, so rigidity can be improved. Furthermore, the bearing surfaces 44 are disposed in the inner longitudinal wall portions 32C and 32D of the present embodiment, and the inner longitudinal wall portions 32C and 32D are joined to the outer longitudinal wall portions 30C and 30D at the bearing surfaces 44. For this reason, when adjusting the evenness of the joint surfaces, it suffices to adjust only the bearing surfaces 44 and it is not necessary to adjust the entire inner longitudinal wall portions 32C and 32D. That is, the amount of time it takes to adjust the evenness of the joint surfaces can be shortened.

It will be noted that, in the present embodiment, although the longitudinal wall joint portion 40 and the longitudinal wall joint portion 42 are formed an equal distance apart from one another from the upper end portion to the lower end portion of the center pillar 16, the longitudinal wall joint portion 40 and the longitudinal wall joint portion 42 are not limited to this and may also be formed an unequal distance apart from one another. For example, the longitudinal wall joint portion 40 and the longitudinal wall joint portion 42 may also be formed closer together on the vehicle upper side of the beltline BL. Furthermore, the pillar structure 28 may also be applied to only part of the center pillar 16. Here, in order to effectively control deformation in which the outer panel 30 and the inner panel 32 become deformed in directions in which they move away from one another, it is preferred that the longitudinal wall joint portion 40 and the longitudinal wall joint portion 42 be disposed at least on the vehicle upper side of the beltline BL.

Furthermore, an embodiment where the pillar structure 28 is applied to the center pillar 16 has been described, but the present invention is not limited to this, and as shown in FIG. 1 the same pillar structure may also be applied to the front pillar 14 and/or the rear pillar 18.

Second Embodiment

Figure 4:
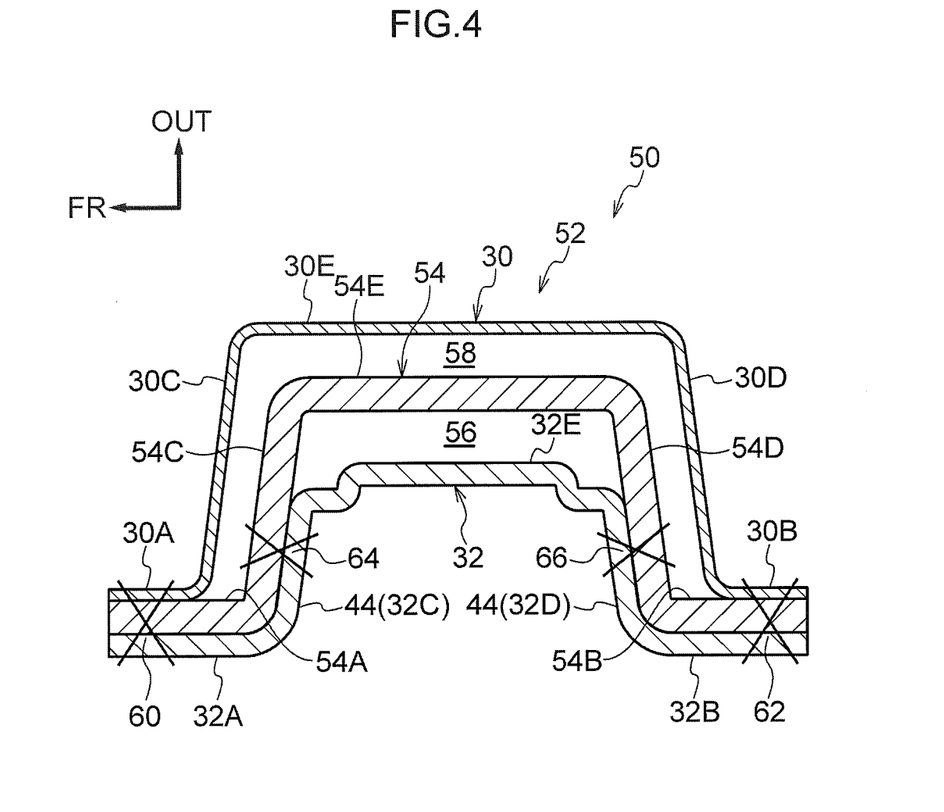
FIG. 4 is a cross-sectional view corresponding to FIG. 2 showing a pillar structure pertaining to a second embodiment.

Next, a center pillar 50 to which a pillar structure 52 pertaining to a second embodiment of the present invention is applied will be described. It will be noted that regarding configurations that are the same as those of the first embodiment, the same reference signs will be assigned thereto and description thereof will be appropriately omitted. As shown in FIG. 4, the center pillar 50 pertaining to the present embodiment is mainly configured to include an outer panel 30, an inner panel 32, and a pillar outer reinforcement 54 that serves as a reinforcement member.

The outer panel 30 is formed in a cross-sectionally substantially hat shape and is equipped with a pair of outer flange portions 30A and 30B, a pair of outer longitudinal wall portions 30C and 30D, and an outer crown portion 30E. Furthermore, the inner panel 32 is formed in a cross-sectionally substantially hat shape, is disposed on the vehicle width direction inside of the outer panel 30, and is equipped with a pair of inner flange portions 32A and 32B, a pair of inner longitudinal wall portions 32C and 32D, and an inner crown portion 32E.

Here, the pillar outer reinforcement 54 is disposed between the outer panel 30 and the inner panel 32. The pillar outer reinforcement 54 is a cross-sectionally substantially hat-shaped metal member and is mainly equipped with a pair of reinforcement flange portions 54A and 54B, a pair of reinforcement longitudinal wall portions 54C and 54D, and a reinforcement crown portion 54E.

The reinforcement flange portion 54A is disposed on the front end portion of the pillar outer reinforcement 54, extends in the vehicle front and rear direction, and is sandwiched between the outer flange portion 30A and the inner flange portion 32A. Furthermore, the reinforcement flange portion 54B is disposed on the rear end portion of the pillar outer reinforcement 54, extends in the vehicle front and rear direction, and is sandwiched between the outer flange portion 30B and the inner flange portion 32B.

Moreover, the reinforcement longitudinal wall portion 54C extends outward in the vehicle width direction from the rear end portion of the reinforcement flange portion 54A, and the reinforcement longitudinal wall portion 54D extends outward in the vehicle width direction from the front end portion of the reinforcement flange portion 54B. Furthermore, the vehicle width direction outside end portion of the reinforcement longitudinal wall portion 54C and the vehicle width direction outside end portion of the reinforcement longitudinal wall portion 54D are coupled to one another in the vehicle front and rear direction by the reinforcement crown portion 54E.

A closed cross section 58 is configured by the pillar outer reinforcement 54 and the outer panel 30 configured as described above, and a closed cross section 56 is configured by the pillar outer reinforcement 54 and the inner panel 32.

Here, the outer flange portion 30A, the reinforcement flange portion 54A, and the inner flange portion 32A are joined to one another by spot welding, for example, so that a flange joint portion 60 is formed. Furthermore, the outer flange portion 30B, the reinforcement flange portion 54B, and the inner flange portion 32B are joined to one another by spot welding, for example, so that a flange joint portion 62 that is same as the flange joint portion 60 is formed.

Moreover, the reinforcement longitudinal wall portion 54C is disposed on top of the inner longitudinal wall portion 32C in the vehicle front and rear direction and is joined to the inner longitudinal wall portion 32C by spot welding, for example, so that a longitudinal wall joint portion 64 is formed. Furthermore, the reinforcement longitudinal wall portion 54D is disposed on top of the inner longitudinal wall portion 32D in the vehicle front and rear direction and is joined to the inner longitudinal wall portion 32D by spot welding, for example, so that a longitudinal wall joint portion 66 is formed.

According to the pillar structure 52 of the present embodiment, the pillar outer reinforcement 54 is disposed between the outer panel 30 and the inner panel 32, so strength can be improved. Furthermore, the pillar structure 52 is equipped with the closed cross section 56 and the closed cross section 58, so the rigidity of the pillar structure 52 can be improved.

Moreover, the reinforcement longitudinal wall portions 54C and 54D of the pillar outer reinforcement 54 and the inner longitudinal wall portions 32C and 32D of the inner pillar 32 are joined to one another to form the longitudinal wall joint portions 64 and 66, so dents or the like during joining are not formed in the outer longitudinal wall portions 30C and 30D of the outer panel 30 configuring the design surface. Because of this, the design can be kept from being marred. Other effects are the same as those of the first embodiment.

It will be noted that, in the present embodiment, although the pillar outer reinforcement 54 and the inner panel 32 are joined to one another to form the longitudinal wall joint portions 64 and 66, the pillar structure 52 is not limited to this. For example, the reinforcement longitudinal wall portions 54C and 54D of the pillar outer reinforcement 54 and the outer longitudinal wall portions 30C and 30D of the outer panel 30 may also be joined to one another. Furthermore, the three plies consisting of the reinforcement longitudinal wall portions 54C and 54D, the outer longitudinal wall portions 30C and 30D, and the inner longitudinal wall portions 32C and 32D may also be joined to one another to form the longitudinal wall joint portions.

Third Embodiment

Figure 5:
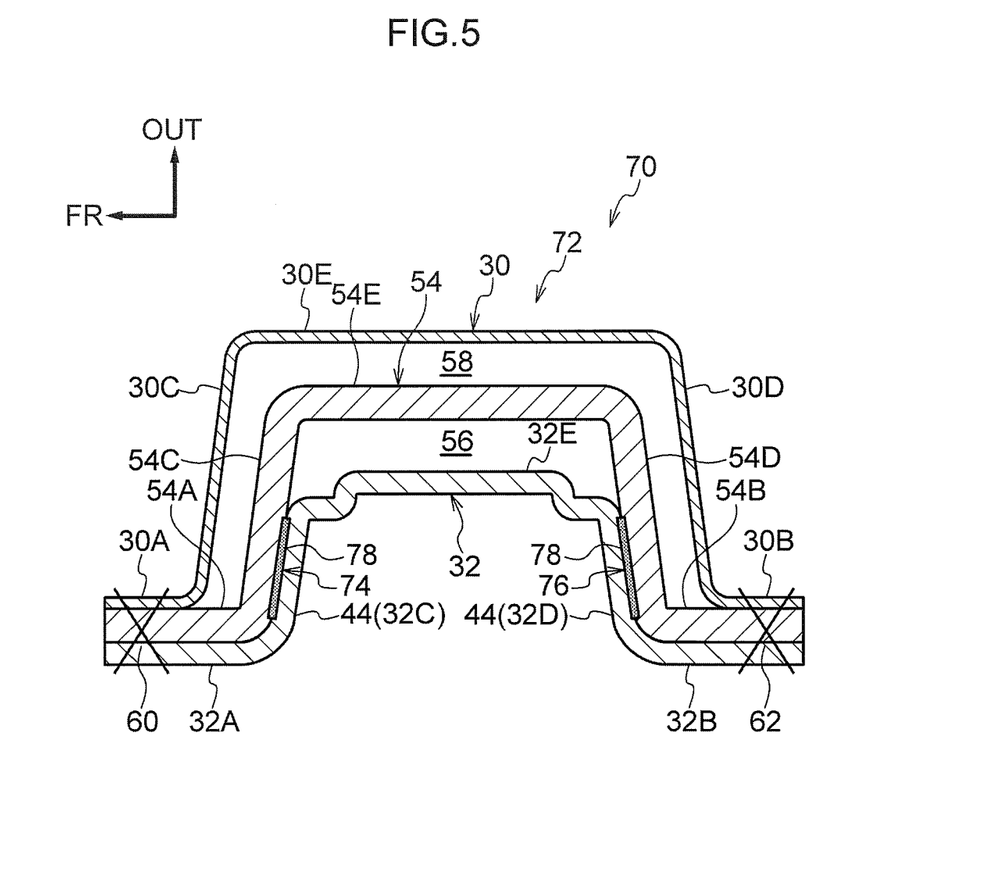
FIG. 5 is a cross-sectional view corresponding to FIG. 2 showing a pillar structure pertaining to a third embodiment.

Next, a center pillar 70 to which a pillar structure 72 pertaining to a third embodiment of the present invention is applied will be described. As shown in FIG. 5, the center pillar 70 pertaining to the present embodiment has the same configuration as the center pillar 50 pertaining to the second embodiment except for a longitudinal wall joint portion 74 and a longitudinal wall joint portion 76.

The longitudinal wall joint portion 74 is formed as a result of the reinforcement longitudinal wall portion 54C of the pillar outer reinforcement 54 and the inner longitudinal wall portion 32C of the inner panel 32 being joined (adhered) to one another by an adhesive 78. Furthermore, the longitudinal wall joint portion 76 is formed as a result of the reinforcement longitudinal wall portion 54D and the inner longitudinal wall portion 32D being joined (adhered) to one another by an adhesive 78.

According to the present embodiment, the step of performing welding such as spot welding can be curtailed. Other effects are the same as those of the first embodiment and the second embodiment.

It will be noted that, in the present embodiment, although the flange joint portions 60 and 62 are formed by joining the outer flange portions 30A and 30B, the reinforcement flange portions 54A and 54B, and the inner flange portions 32A and 32B to one another by spot welding, for example, the pillar structure 72 is not limited to this, and the reinforcement flange portions 54A and 54B and the inner flange portions 32A and 32B may also be joined to one another using the adhesive 78 like the longitudinal wall joint portions 74 and 76. Furthermore, in this case, for example, the reinforcement flange portions 54A and 54B and the inner flange portions 32A and 32B may also be joined to one another by applying the adhesive 78 to the entire region ranging from the inner flange portion 32A to the inner longitudinal wall portion 32C and the entire region ranging from the inner flange portion 32B to the inner longitudinal wall portion 32D.

Fourth Embodiment

Figure 6:
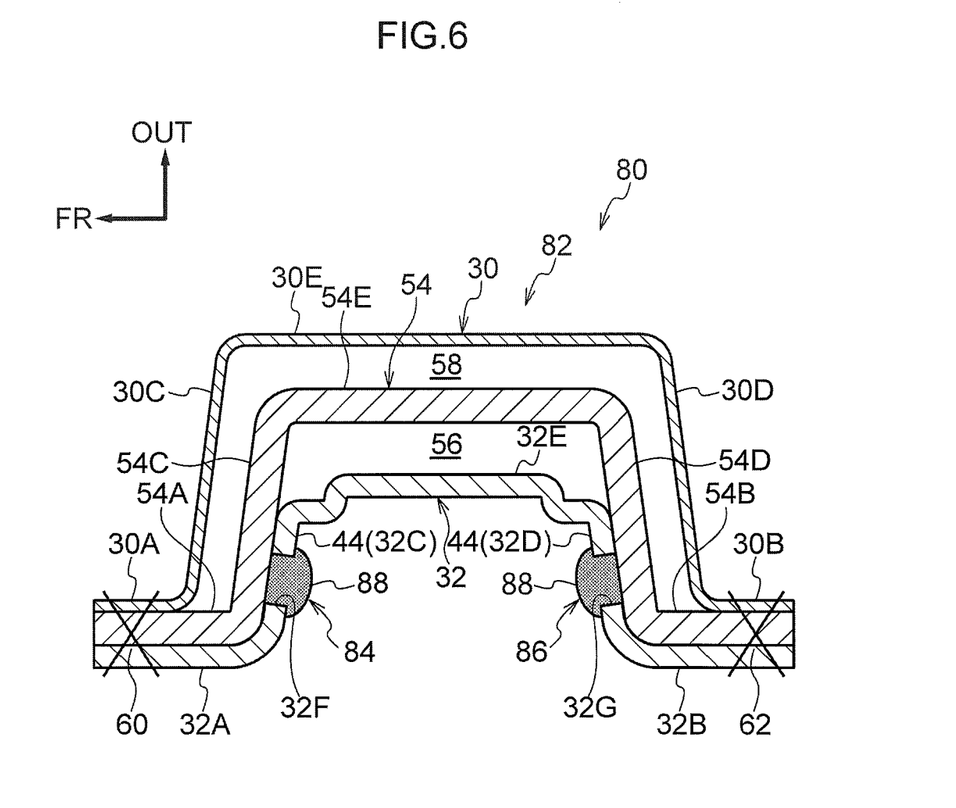
FIG. 6 is a cross-sectional view corresponding to FIG. 2 showing a pillar structure pertaining to a fourth embodiment.

Next, a center pillar 80 to which a pillar structure 82 pertaining to a fourth embodiment of the present invention is applied will be described. As shown in FIG. 6, the center pillar 80 pertaining to the present embodiment has the same configuration as the center pillar 50 pertaining to the second embodiment and center pillar 70 pertaining to the third embodiment except for a longitudinal wall joint portion 84 and a longitudinal wall joint portion 86.

The longitudinal wall joint portion 84 is formed as a result of the reinforcement longitudinal wall portion 54C of the pillar outer reinforcement 54 and the inner longitudinal wall portion 32C of the inner panel 32 being joined to one another by arc welding. Specifically, a welding torch not shown in the drawings is brought close to a through hole 32F formed in the inner longitudinal wall portion 32C, and a welding wire 88 extending from the tip of the welding torch is fused in the through hole 32F to thereby form the longitudinal wall joint portion 84 in which the reinforcement longitudinal wall portion 54C and the inner longitudinal wall portion 32C are joined to one another.

Furthermore, the longitudinal wall joint portion 86 is formed as a result of the reinforcement longitudinal wall portion 54D and the inner longitudinal wall portion 32D being joined to one another by arc welding. That is, a welding wire 88 is extended from the tip of the welding torch and fused in a through hole 32G formed in the inner longitudinal wall portion 32D to thereby form the longitudinal wall joint portion 86 in which the reinforcement longitudinal wall portion 54D and the inner longitudinal wall portion 32D are joined to one another.

Vehicle side portion structures pertaining to the first embodiment to the fourth embodiment of the present invention have been described above, but these embodiments may also be appropriately combined and used, and the present invention can be implemented in a variety of ways without departing from the spirit thereof. For example, spot welding and an adhesive may be combined to form the longitudinal wall joint portions.

What is claimed is:

1. A pillar structure comprising:
   an outer panel that extends in a vehicle up and down direction in a state in which the pillar structure is attached to a vehicle, the outer panel having (i) a pair of outer flange portions that extend in a vehicle front and rear direction, (ii) outer longitudinal wall portions that extend outward in a vehicle width direction from the pair of outer flange portions, and (iii) an outer crown portion that interconnects vehicle width direction outside end portions of the outer longitudinal wall portions;
   an inner panel that is disposed on a vehicle width direction inside of the outer panel and extends in the vehicle up and down direction along the outer panel, the inner panel having (a) a pair of inner flange portions that are joined to the pair of outer flange portions, (b) inner longitudinal wall portions that extend outward in the vehicle width direction from the pair of inner flange portions, and (c) an inner crown portion that interconnects vehicle width direction outside end portions of the inner longitudinal wall portions; and
   longitudinal wall joint portions that join the outer longitudinal wall portions and the inner longitudinal wall portions to one another.

2. A pillar structure comprising:
   an outer panel that extends in a vehicle up and down direction in a state in which the pillar structure is attached to a vehicle, the outer panel having (i) a pair of outer flange portions that extend in a vehicle front and rear direction, (ii) outer longitudinal wall portions that extend outward in a vehicle width direction from the pair of outer flange portions, and (iii) an outer crown portion that interconnects vehicle width direction outside end portions of the outer longitudinal wall portions;
   an inner panel that is disposed on a vehicle width direction inside of the outer panel and extends in the vehicle up and down direction along the outer panel, the inner panel having (a) a pair of inner flange portions that are joined to the pair of outer flange portions, (b) inner longitudinal wall portions that extend outward in the vehicle width direction from the pair of inner flange portions, and (c) an inner crown portion that interconnects vehicle width direction outside end portions of the inner longitudinal wall portions;
   a reinforcement member that is disposed between the outer panel and the inner panel, the reinforcement member having (1) a pair of reinforcement flange portions that are joined to the outer flange portions and the inner flange portions, (2) reinforcement longitudinal wall portions that extend outward in the vehicle width direction from the pair of reinforcement flange portions, and (3) a reinforcement crown portion that interconnects vehicle width direction outside end portions of the reinforcement longitudinal wall portions; and
   longitudinal wall joint portions that join the inner longitudinal wall portions and the reinforcement longitudinal wall portions to one another.

3. The pillar structure of claim 1, wherein the outer panel and the inner panel define an enclosed chamber.

4. The pillar structure of claim 2, wherein the reinforcement member and the inner panel define an enclosed chamber.

5. The pillar structure of claim 1, wherein the longitudinal wall joint portions are at least disposed on a vehicle upper side of a door beltline in a state in which the pillar structure is attached to a vehicle.

6. The pillar structure of claim 2, wherein the longitudinal wall joint portions are at least disposed on a vehicle upper side of a door beltline in a state in which the pillar structure is attached to a vehicle.

7. The pillar structure of claim 1, wherein the longitudinal wall joint portions of the inner longitudinal wall portions have bearing surfaces that bulge out in opposite directions from directions heading toward the opposing inner longitudinal wall portions.

8. The pillar structure of claim 2, wherein the longitudinal wall joint portions of the inner longitudinal wall portions have bearing surfaces that bulge out in opposite directions from directions heading toward the opposing inner longitudinal wall portions.

9. A vehicle side portion structure comprising:
a center pillar comprising:
   an outer panel that extends in a vehicle up and down direction in a state in which the pillar structure is attached to a vehicle, the outer panel having (i) a pair of outer flange portions that extend in a vehicle front and rear direction, (ii) outer longitudinal wall portions that extend outward in a vehicle width direction from the pair of outer flange portions, and (iii) an outer crown portion that interconnects vehicle width direction outside end portions of the outer longitudinal wall portions;
   an inner panel that is disposed on a vehicle width direction inside of the outer panel and extends in the vehicle up and down direction along the outer panel, the inner panel having (a) a pair of inner flange portions that are joined to the pair of outer flange portions, (b) inner longitudinal wall portions that extend outward in the vehicle width direction from the pair of inner flange portions, and (c) an inner crown portion that interconnects vehicle width direction outside end portions of the inner longitudinal wall portions; and
   longitudinal wall joint portions that join the outer longitudinal wall portions and the inner longitudinal portions to one another; and
a vehicle side portion having the center pillar in a center portion, in the vehicle front and rear direction, of the vehicle side portion.

10. A vehicle side portion structure comprising:
a center pillar comprising:
   an outer panel that extends in a vehicle up and down direction in a state in which the pillar structure is attached to a vehicle, the outer panel having (i) a pair of outer flange portions that extend in a vehicle front and rear direction, (ii) outer longitudinal wall portions that extend outward in a vehicle width direction from the pair of outer flange portions, and (iii) an outer crown portion that interconnects vehicle width direction outside end portions of the outer longitudinal wall portions;
   an inner panel that is disposed on a vehicle width direction inside of the outer panel and extends in the vehicle up and down direction along the outer panel, the inner panel having (a) a pair of inner flange portions that are joined to the pair of outer flange portions, (b) inner longitudinal wall portions that extend outward in the vehicle width direction from the pair of inner flange portions, and (c) an inner crown portion that interconnects vehicle width direction outside end portions of the inner longitudinal wall portions; and
   a reinforcement member that is disposed between the outer panel and the inner panel, the reinforcement member having (1) a pair of reinforcement flange portions that are joined to the outer flange portions and the inner flange portions, (2) reinforcement longitudinal wall portions that extend outward in the vehicle width direction from the pair of reinforcement flange portions, and (3) a reinforcement crown portion that interconnects vehicle width direction outside end portions of the reinforcement longitudinal wall portions; and
   longitudinal wall joint portions that join the inner longitudinal wall portions and the reinforcement longitudinal wall portions to one another; and
a vehicle side portion having the center pillar in center portion, in the vehicle front and rear direction, of the vehicle side portion.

* * * * *